United States Patent [19]

Hishida

[11] 4,025,135
[45] May 24, 1977

[54] BEARING ASSEMBLY

[75] Inventor: Tadashi Hishida, Sakai, Japan

[73] Assignee: Wada Seiko Kabushiki Kaisha (Wada Seiko Co., Ltd.), Sakai, Japan

[22] Filed: Aug. 12, 1975

[21] Appl. No.: 603,942

[30] Foreign Application Priority Data

Aug. 14, 1974  Japan ................... 49-97622[U]
Feb. 26, 1975  Japan ................... 50-27996[U]

[52] U.S. Cl. ......................... 308/194; 308/72; 308/184 A
[51] Int. Cl.[2] ............................. F16C 9/06
[58] Field of Search ............. 308/189 R, 190, 193, 308/194, 28, 184 R, 184 A, 72

[56] References Cited

UNITED STATES PATENTS

| | | | |
|---|---|---|---|
| 2,819,128 | 1/1958 | Downs | 308/194 |
| 2,906,572 | 9/1959 | Wroby | 308/28 |
| 3,224,821 | 12/1965 | Barr | 308/194 |
| 3,477,772 | 11/1969 | Anderson et al. | 308/194 |
| 3,700,298 | 10/1972 | Hay | 308/194 |
| 3,756,675 | 9/1973 | Mangiavacchi | 308/194 |

Primary Examiner—Joseph F. Peters, Jr.
Assistant Examiner—Richard A. Bertsch
Attorney, Agent, or Firm—George B. Oujevolk

[57] ABSTRACT

A bearing assembly is disclosed which includes a ball bearing, a cover secured to the outer race of the bearing, and a synthetic resin molded member formed on the cover by injection molding. This bearing design reduces the necessity of machining substantially and is therefore suited for mass production.

1 Claim, 4 Drawing Figures

BEARING ASSEMBLY

The present invention relates generally to a self-aligning bearing assembly, and more particularly to a bearing assembly which has a synthetic resin member molded integrally with the outer race of a bearing through a cover.

Conventional self-aligning bearings such as ball bearings have the outer periphery of an outer race ground spheric to be rollable in a spherical recess formed in the inner periphery of a receiving member mounted thereon. Made by metal, both the outer race and the receiving member required machining for spherical surface. This increases the manufacturing cost.

It is an object of the present invention to provide a bearing assembly which is easier to mass produce than conventional bearings.

Other objects and advantages of the present invention will become apparent from the following description with reference to the accompanying drawings, wherein.

Figure 1:
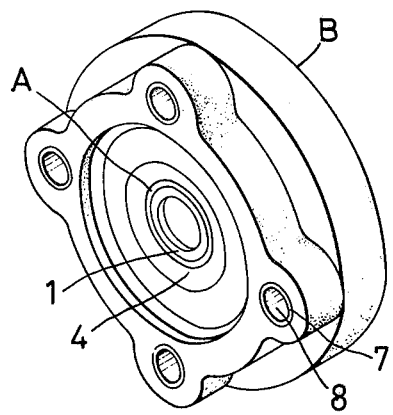
FIG. 1 is a perspective view of a bearing assembly according to the present invention.

Referring to FIG. 1 showing a preferred embodiment of the present invention, a ball bearing A has an inner race 1, balls 2 and an outer race 3, all of them being made of metal. A pair of metal rings of L-shape section are secured to the outer periphery of the outer race 3 to form a cover 4 having a recess of U-shape section to enclose the outer race 3 and the balls 2.

The cover 4 has an annular flange 5 formed on its outer periphery by the outer edges of the metal rings, said flange having notches 6 formed therein.

The letter B designates a member made of such hard synthetic resin material as nylon, ABS resin, and glass fiber reinforced resin by injection molding. The molded member B is formed with holes 8 for bolts which are reinforced by metal pipes 7 inserted therein.

After the bearing A has been set in a metal mold with the cover 4 secured to the outer periphery of the outer race 3, synthetic resin is injected thereinto to mold the member B integrally with the cover 4. In molding process, synthetic resin fills the notches 6 and embeds the flange 5 to make the member B integral with the cover 4, thus preventing the rotation of the member B relative to the cover 4.

Figure 3:
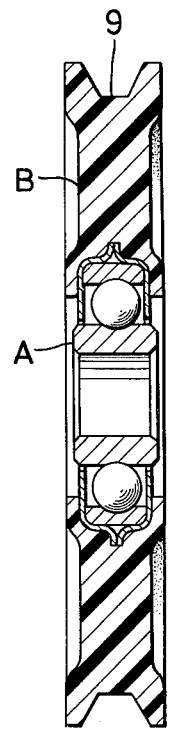
FIG. 3 is a similar view of a second embodiment of the present invention.

FIG. 3 shows another ambodiment in which the member B is molded with an annular groove 9 formed in the outer periphery thereof and no bolt holes formed instead.

Figure 4:
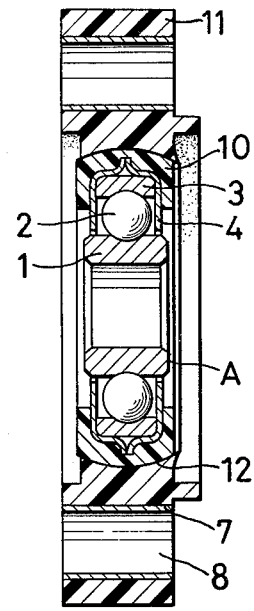
FIG. 4 is a similar view of a third embodiment thereof.
Figure 2:
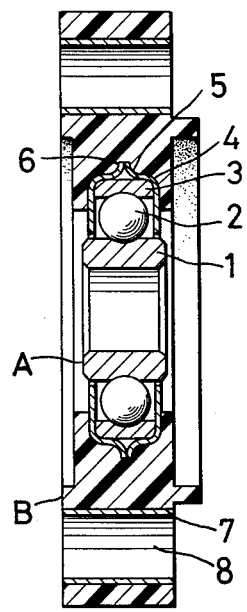
FIG. 2 is a longitudinal cross-sectional view thereof.

FIG. 4 shows a third embodiment in which a spherical member 10 is molded integrally with the outer race 3 with the interposition of the cover 4.

On the spherical member 10 is mounted a receiving member 11 having such a spherical recess 12 at its inner periphery as to fit the outer spherical periphery of the spherical member 10 and allow it to be rollable therein. The receiving member 11 is formed with holes 9 for bolts reinforced by metal pipes 10 mounted therein.

Both the annular member 10 and the receiving member 11 are made of the same synthetic resin by injection molding and thus require no machining. Also, these members produce little error due to temperature change since the same material is used.

It will be understood from the foregoing description that the present invention eliminates the need of grinding the outer periphery of the outer race 3 and the inner periphery of the receiving member for spheric surface or forming eccentric grooves or recesses in the outer periphery of the former for engagement with the latter as was the case with conventional bearings. Furthermore, this invention enables the molded member B to be formed in any desired shape. The bearing assembly according to the present invention is easier to manufacture and therefore is more suitable for mass production than prior art bearings of this kind.

Also, a considerable material injection pressure is applied to the cover 4 during molding, and a contraction pressure after molding, so as to press and deform it against the outer race 3, thus ensuring that the cover 4 is secured to the outer race 3 with greater strength.

If this design is utilized with inexpensive open type bearings, it also prolongs their working life because the cover 4 encloses or seals the balls 2 effectively.

The cover 4 may be made of rubber or plastic. If it is made of metal, rubber rings may be disposed between the opposed inner open edges of the cover 4 and the inner race 1 to prevent wear.

While the invention has been particularly shown and described with reference to preferred embodiments thereof, it will be understood that other changes can be made without departing from the spirit and scope of the invention.

What is claimed is:

1. In a ball bearing assembly having an outer race (3), an inner race (1), and a plurality of balls (2), in combination therewith:
   a. an annular cover (4) secured to the outer periphery of the outer race (3), said cover (4) having a recess of U-shape section formed to enclose the outer race (3) and the balls;
   b. an annular flange (5) formed on the outer periphery thereof with notches;
   c. a molded spherical member (10) of synthetic resin molded on said cover (4) to be integral therewith and said outer race, said spherical member having a spherical surface on the outer periphery thereof; and,
   d. a molded receiving member of synthetic resin having an inner periphery (12) mounted on said spherical member (10), said spherical member (10) being rollable in said receiving member.

* * * * *